US010317119B2

(12) United States Patent
Zou (10) Patent No.: US 10,317,119 B2
(45) Date of Patent: Jun. 11, 2019

(54) TRANSPORTABLE CLIMATE-CONTROLLED UNITS FOR FULFILLMENT OF PERISHABLE GOODS (71) Applicant: Amazon Technologies, Inc., Seattle, WA (US)

(72) Inventor: Le Zou, Cambridge, MA (US)

(73) Assignee: Amazon Technologiess, Inc., Seattle, WA (US)

(*) Notice: Subject to any disclaimer, the term of this patent is extended or adjusted under 35 U.S.C. 154(b) by 120 days.

(21) Appl. No.: 15/247,449

(22) Filed: Aug. 25, 2016

(65) Prior Publication Data
US 2018/0058739 A1    Mar. 1, 2018

(51) Int. Cl.
F25B 49/00    (2006.01)
F25D 11/00    (2006.01)
H02J 7/00    (2006.01)
G06Q 10/08   (2012.01)

(52) U.S. Cl.
CPC .............. F25B 49/00 (2013.01); F25D 11/00 (2013.01); H02J 7/00 (2013.01); F25B 2600/07 (2013.01); F25B 2700/2104 (2013.01); F25D 2400/12 (2013.01); F25D 2400/32 (2013.01); F25D 2400/38 (2013.01); G06Q 10/087 (2013.01); H02J 2007/0096 (2013.01)

(58) Field of Classification Search
CPC .............. F25B 49/00; F25B 2700/2104; F25B 2600/07; F25D 11/00; F25D 2400/12
See application file for complete search history.

(56) References Cited

U.S. PATENT DOCUMENTS

| 8,736,228 B1 | 5/2014 | Freed et al. |
| 9,008,827 B1* | 4/2015 | Dwarakanath ....... G06Q 10/087 700/213 |
| 2012/0109378 A1* | 5/2012 | Kim .................. F25D 11/00 700/259 |
| 2016/0236867 A1 | 8/2016 | Brazeau et al. |

FOREIGN PATENT DOCUMENTS

WO    2014116947 A1    7/2014

OTHER PUBLICATIONS

International Search Report and Written Opinion dated Oct. 24, 2017 (PCT/US2017/048358).

* cited by examiner

Primary Examiner — Larry L Furdge
(74) Attorney, Agent, or Firm — Thomas | Horstemeyer, LLP (57) ABSTRACT Disclosed are various embodiments for fulfillment of perishable goods using transportable climate-controlled units. A computing environment may control operation and transportation of network-enabled refrigeration units using mobile drive units capable of navigating a materials handing center or other space. The mobile drive units may recharge or otherwise provide power to the refrigeration units, for example, as they are transported.

21 Claims, 7 Drawing Sheets

TRANSPORTABLE CLIMATE-CONTROLLED UNITS FOR FULFILLMENT OF PERISHABLE GOODS

BACKGROUND

Various providers may offer perishable goods or other items to customers that must be stored at a specified temperature. Fulfillment of the items for delivery may include having to store the items in refrigeration units. Traditionally, fulfillment of these items is a slow, costly, and labor-intensive process as workers in a fulfillment center must walk to an area where multiple refrigerators are stored and locate a particular item. These refrigerators have little or no mobility as they are required to be connected to power outlets with an electrical cord at all times. Additionally, the cost of building and maintaining refrigerated space and the associated electrical expenses are economically infeasible.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to transportable climate-controlled units for fulfillment of perishable goods. Home delivery of groceries and other perishable products creates a need for improved fulfillment center technologies for storing inventory in a refrigerated state, and for facilitating picking and packing of such items for efficient fulfillment to customers. However, fulfillment of perishable goods is a costly, inefficient, and labor-intensive manual process. For instance, perishable goods are typically stored in refrigerators connected to power outlets with an electrical cord. An agent of a fulfillment center may receive an order and manually obtain perishable goods individually from refrigerators. While one solution might include adjusting the climate of a fulfillment center or warehouse where items are stored for fulfillment, different temperature and humidity requirements of different perishable goods makes this solution impractical. Furthermore, the cost of building and maintaining such a fulfillment center is economically infeasible.

Accordingly, a system for storage and fulfillment of perishable goods using transportable climate-controlled units is described, allowing items requiring storage at a predetermined temperature to be transported automatically for fulfillment. A mobile drive unit may, either autonomously or semi-autonomously, navigate to a location of an inventory holder within a materials handling center. In various embodiments, the inventory holder includes one or more mobile refrigeration units powered by an independent power supply. The mobile drive unit may dock with the inventory holder and move the inventory holder to another location within the materials handling center. The mobile drive unit may share resources with the one or more refrigeration units, as will be discussed.

In the following discussion, a general description of a system for fulfillment of perishable goods using transportable climate-controlled units and its components is provided, followed by a discussion of the operation of the same.

Figure 1:
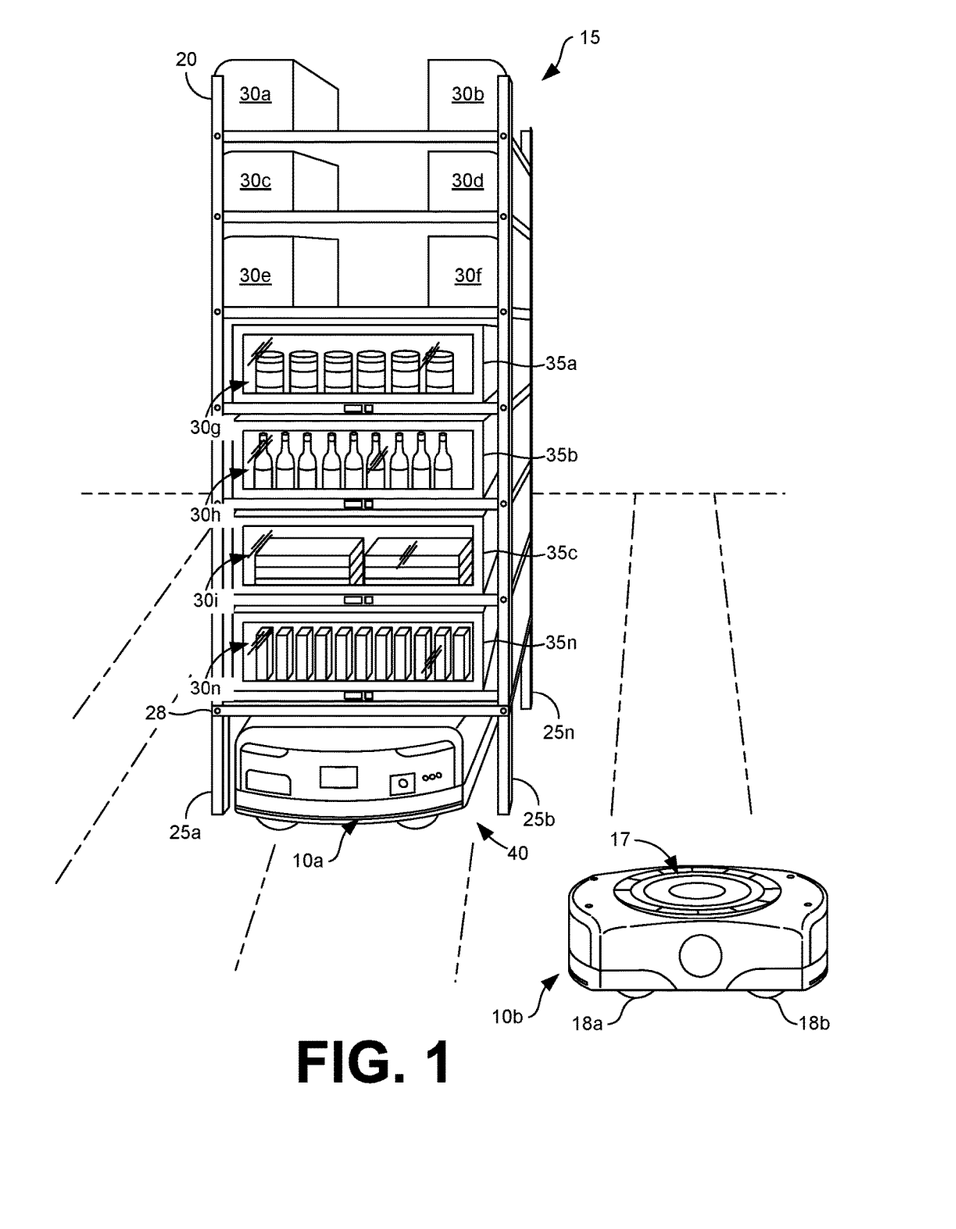
FIGS. 1 and 2 are drawings of inventory holders and mobile drive units according to various embodiments of the present disclosure.

With respect to FIG. 1, mobile drive units 10a . . . 10b (collectively "mobile drive units 10") and an inventory holder 15 are shown according to various embodiments. The mobile drive units 10 may navigate about a space, such as a warehouse, a materials handling center, or other similar location, to transport inventory holders 15 to particular locations for item fulfillment. For example, items stored in the inventory holders 15 may be transported to a packing station for access by workers in the materials handling center, who can then remove items from the inventory holder 15 and package those items for delivery.

To navigate a space, the mobile drive units 10 may include one or more sensors configured to detect or determine the location of the mobile drive units 10 or the inventory holder 15. For example, the mobile drive units 10 may include a position sensor, an obstacle sensor, or other sensors. The mobile drive units 10 may transport inventory holders 15 at the direction of a server, or collection of servers, using wireless communication. To this end, the mobile drive units 10 may include a network interface and processing circuitry that performs drive and transport operations, as instructed. In some embodiments, the mobile drive units 10 may include a mobile drive unit 10 as discussed in U.S. patent application Ser. No. 14/095,751, entitled "Transporting Inventory Items Using Mobile Drive Units and Conveyance Equipment," filed on Dec. 3, 2013, which is hereby incorporated by reference in its entirety herein.

To transport an inventory holder 15, the mobile drive units 10 may include a docking component 17 that couples a mobile drive unit 10 to the inventory holder 15. The docking component 17 may also allow the mobile drive unit 10 to maneuver the inventory holder 15 by lifting, propelling, rotating, or otherwise moving the inventory holder 15 from one location to another. The docking component 17 may include any appropriate combination of components to couple the mobile drive unit 10 to the inventory holder 15, such as projecting forks, ribs, or spikes. In some embodiments, the coupling component may be projected from the mobile drive unit 10 after rotating in a circular or corkscrew movement. The docking component 17 may include a high-friction portion that couples to a portion of the inventory holder 15 while a mobile drive unit 10 is docked to the inventory holder 15.

The mobile drive units 10 may include a drive module that enables the mobile drive units 10 to transport an inventory holder 15. The drive module may include, for example, wheels 18a . . . 18b (collectively "wheels 18"), axles, transmissions, or other similar components, as may be appreciated. In some embodiments, the wheels 18 may include motorized wheels, stabilizing wheels, or a combination thereof.

The inventory holder 15 may include a frame 20, a plurality of legs 25a . . . 25n (collectively "legs 25"), and a docking surface 28. The frame 20 may hold inventory items 30a . . . 30n (collectively "inventory items 30" or "items 30") as well as mobile refrigeration units 35a . . . 35n (collectively "refrigeration units 35") on shelving or similar surfaces. The frame 20 provides storage space for storing inventory items 30 external or internal to the frame 20. The storage space provided by the frame 20 may be divided into rows, each capable of holding inventory items 30 or one or more refrigeration units 35. The refrigeration units 35 may include perishable types of inventory items 30, as may be appreciated, or types of inventory items 30 requiring storage at a predetermined temperature. To this end, the frame 20 of the inventory holder 15 allows perishable inventory items 30 to be comingled with non-perishable inventory items 30.

Additionally, the frame 20 may include an opening 40 that allows a mobile drive unit 10 to position itself underneath the docking surface 28 of the frame 20. The size, shape, and placement of the opening 40 may be based at least in part on the size, the shape, and other characteristics of the mobile drive unit 10 or the inventory holder 15. For example, the frame 20 of the inventory holder 15 includes four legs 25 that form an opening 40 between the legs 25, thereby allowing the mobile drive unit 10 to navigate underneath the frame 20 and adjacent to the docking surface 28 of the frame 20. The length of legs 25 may be determined based at least in part on a height of the mobile drive unit 10.

The refrigeration units 35 may include, for example, devices capable of maintaining a temperature of an inventory item 30 at a predetermined temperature, such as a temperature at or below room temperature. To this end, the refrigeration units 35 may include, for example, a compressor, expansion valve, refrigerant, and heat-exchanging pipes. To comingle perishable inventory items 30 with non-perishable inventory items 30, the refrigeration units 35 may be of a size and shape to fit on shelves or other surfaces of the inventory holder 15. To facilitate mobility of the refrigeration units 35, the refrigeration units 35 may include an independent power supply. In some embodiments, the independent power supply may include a battery or, in some embodiments, the refrigeration units 35 can electrically couple to a battery of the mobile drive unit 10 or a battery stored on the inventory holder 15, as will be discussed. To couple to a battery, the refrigeration unit 35 may be configured to operate with a direct current (DC) power source, as opposed to an alternating current (AC) power source. In some embodiments, the refrigeration units 35 are configured to operate with a DC power source of 12 volts, 24 volts, 48 volts, or other suitable voltage.

The refrigeration units 35 may include climate-control mechanisms to have varying and independent climates. In other words, each of the refrigeration units 35 may operate at a temperature or humidity level potentially different than other one of the refrigeration units 35 by having its own processing circuitry, battery, sensors, or related components. In various embodiments, the refrigeration units 35 are controlled remotely by a server or collection of servers to adjust an internal temperature or humidity level based at least in part on the items 30 stored therein. In further embodiments, the refrigeration units 35 may share resources among other refrigeration units 35. For instance, a battery of a first refrigeration unit 35 may provide power to a second refrigeration unit 35 and vice versa depending on, for example, required and available resources.

The docking surface 28 may include a portion of the inventory holder 15 that couples to, abuts, or rests on a portion of the mobile drive unit 10, for example, when the mobile drive unit 10 is docked to inventory holder 15 for transportation of the inventory holder 15. In some embodiments, the mobile drive unit 10 may electronically couple to circuitry of the inventory holder 15 or the refrigeration units 35. For example, a battery of the mobile drive unit 10 may provide power to the refrigeration units 35, as will be discussed.

While embodiments described herein refer to refrigeration units 35, the disclosure is not so limited. In other embodiments, refrigeration units 35 may include heating units that have inventory items 30 therein stored at a predetermine temperature above room temperature, such as an oven.

Figure 2:
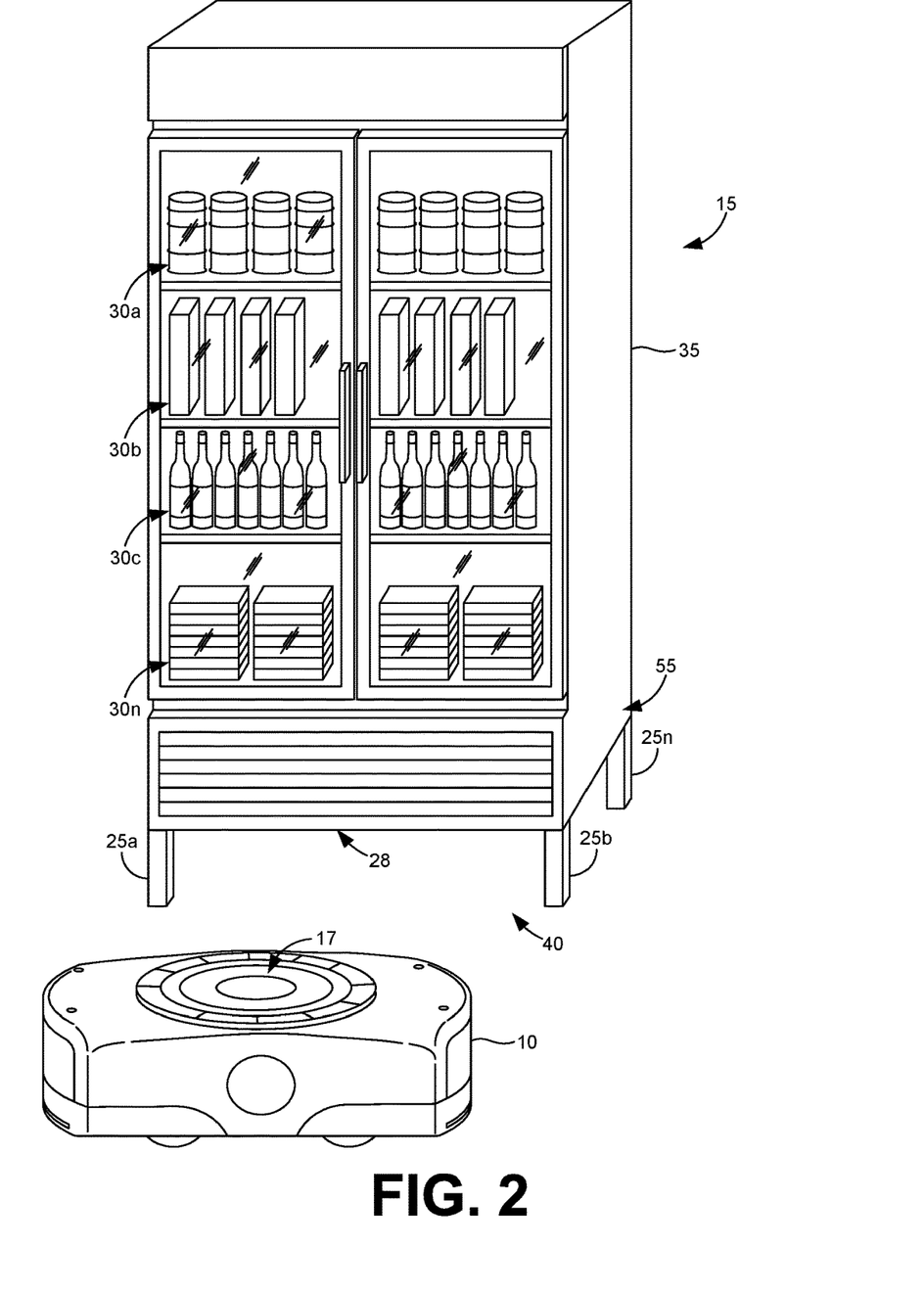

Turning now to FIG. 2, a mobile drive unit 10 and an inventory holder 15 are shown according to various embodiments. While the inventory holder 15 of FIG. 1 allows perishable inventory items 30 to be comingled with non-perishable inventory items 30 through the use of refrigeration units 35 capable of fitting on shelves of the inventory holder 15, the inventory holder 15 of FIG. 2 includes a stand-alone refrigeration unit 35 having dimensions similar to the inventory holder 15 such that it is capable of docking to and being transported by the mobile drive unit 10.

The refrigeration unit 35 may hold inventory items 30a . . . 30n in various arrangements. For instance, the inventory items 30a . . . 30n may be arranged in the refrigeration unit 35 by product type on shelves, in bins, or other similar arrangement. To this end, items with similar refrigeration requirements may be stored in the same bins, on the same shelves, or other together at a same temperature to provide efficient use of refrigeration. In some embodiments, different regions of the refrigeration unit 35 may have independent climates, meaning that internal temperatures or humidity levels can vary from one region to another. These regions may be referred to as cells of the refrigeration unit 35, where each cell has its own climate. In some embodiments, each cell may include a door, drawer, curtain, or other opening mechanism to maintain its climate independent of the refrigeration unit 35 or other cells of the refrigeration unit 35.

Similar to the inventory holder 15 of FIG. 1, the refrigeration unit 35 may include legs 25a . . . 25n that form an opening 40 allowing the mobile drive unit 10 to position itself underneath the docking surface 28 of the frame 20. For example, the four legs 25 of the refrigeration unit form the opening 40 that allows the mobile drive unit 10 to navigate underneath the frame 20 and adjacent to the docking surface 28 of the frame 20. The length of legs 25 may be determined based at least in part on a height of the mobile drive unit 10, as may be appreciated. In some embodiments, the length of legs 25 is provided to allow the opening 40 to be accessed on all four sides by the mobile drive unit 10.

To transport the refrigeration unit 35, the mobile drive unit 10 may utilize a docking component 17 that couples the mobile drive unit 10 to the refrigeration unit 35. In some embodiments, the docking component 17 may be projected from the mobile drive unit 10 after rotating in a circular or corkscrew movement when the mobile drive unit 10 is positioned in the opening 40. The projecting docking component 17 may engage to a suitable portion of a base 55 of the refrigeration unit 35, such as the docking surface 28 or portals provided therein. Additionally, the docking component 17 may include a high-friction portion that couples to a portion of the refrigeration unit 35 while a mobile drive unit 10 is docked. The docking component 17 may also include one of a male or female port located at or near a top surface of the mobile drive unit 10 that couples to an opposing male or female port location at or near a docking surface 28 of the inventory holder 15. When the mobile drive unit 10 is docked or coupled to the inventory holder 15, an electrical coupling is established, thereby allowing power from a battery of the mobile drive unit 10 to recharge a battery of the refrigeration unit 35.

The mobile drive unit 10 may include a control module that monitors and controls operation of the mobile drive unit 10 and causes the mobile drive unit 10 to dock with an inventory holder 15 or stand-alone refrigeration unit 35, as shown in FIG. 2. The control module may include processing circuitry that receives information from sensors, such as a position sensor. Additionally, in various embodiments, the mobile drive unit 10 may comprise a network interface capable of communicating with a remote computing device, or collection of remote computing devices, to receive commands to transport an inventory holder 15 or refrigeration unit 35 associated therewith from a first location to a second location. The processing circuitry may further provide resources to the refrigeration unit 35, such as enabling an electrical coupling between the refrigeration unit 35, or any of its components, with a battery of the mobile drive unit 10.

Figure 3:
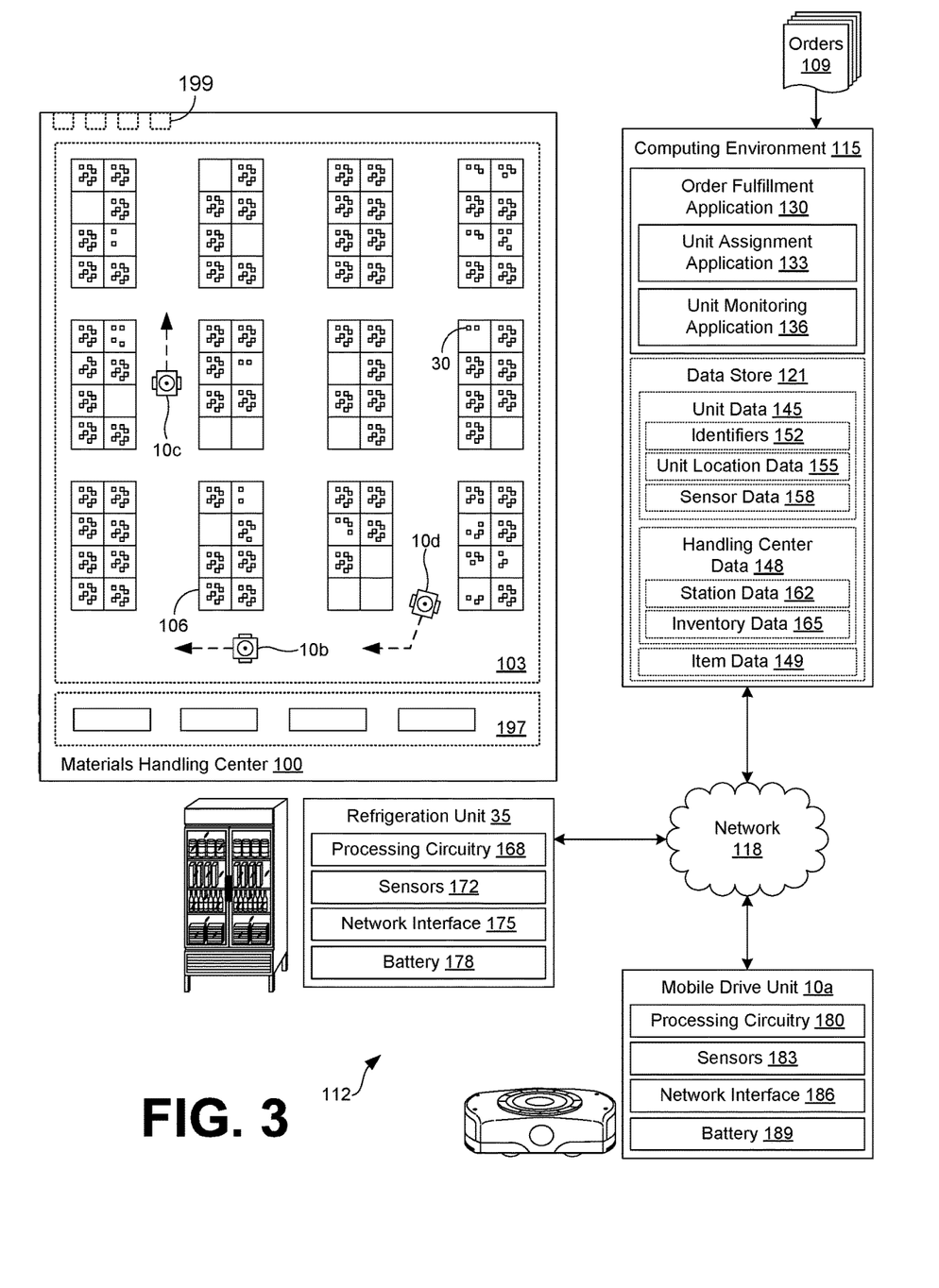
FIG. 3 is a drawing of a networked environment according to various embodiments of the present disclosure.

With reference to FIG. 3, shown is a drawing that depicts one example of a materials handling center 100 according to an embodiment of the present disclosure. A materials handling center 100 may include, but is not limited to, a warehouse, distribution center, cross-docking facility, order fulfillment center (also referred to as a "fulfillment facility"), packaging facility, shipping facility, or other facility or combination of facilities for performing one or more functions of material or inventory handling. Although the materials handling center 100 is described herein with specific reference to a fulfillment center, it is understood that a materials handling center 100 provides one example of many other types of environments to which the principles described herein apply.

According to the illustration provided herein, the materials handling center 100 may comprise, for example, a large warehouse or other structure that includes an inventory storage area 103 having a plurality of inventory locations 106. The inventory locations 106 are generally locations configured for the storage of inventory items 30. To this end, the inventory locations 106 may comprise, for example, bins, slots, shelves, containers, receptacles, crates, stalls, cribs, cordoned areas, hooks, racks, or other locations in an inventory holder 15 and/or in a refrigeration unit 35. The materials handling center 100 may be configured to provide fulfillment of orders 109 received for the inventory items 30 that are purchased, rented, leased or otherwise consumed or requested, as will be described.

The inventory items 30 may comprise, for example, products that are purchased or requested by consumers through various channels. Such products may be any type of product that can be purchased and delivered to customers such as, for example, clothing items, retail goods, hardware, electronics, toys, media items, or any other product. Additionally, the inventory items 30 can include perishable food products, such as fruit, vegetables, meat, or other product that may be required to be stored at a certain temperature. In various embodiments, the inventory items 30 fulfilled in the materials handling center 100 may be purchased over an electronic commerce system.

Associated with the materials handling center 100 is a networked environment 112 that orchestrates the operation of the materials handling center 100 in fulfilling orders 109 for the purchase of inventory items 30 or orders 109 for the movement of items 30 to other materials handling centers 100. The networked environment 112 includes a computing environment 115, a refrigeration unit 35, and mobile drive units 10a . . . 10d which are in data communication with each other via a network 118. The network 118 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 115 may comprise, for example, a server computer or any other system providing computing capability. Alternatively, the computing environment 115 may employ a plurality of computing devices that may be arranged, for example, in one or more server banks or computer banks or other arrangements. Such computing devices may be located in a single installation or may be distributed among many different geographical locations. For example, the computing environment 115 may include a plurality of computing devices that together may comprise a hosted computing resource, a grid computing resource and/or any other distributed computing arrangement. In some cases, the computing environment 115 may correspond to an elastic computing resource where the allotted capacity of processing, network, storage, or other computing-related resources may vary over time.

Various applications and/or other functionality may be executed in the computing environment 115 according to various embodiments. Also, various data is stored in a data store 121 that is accessible to the computing environment 115. The data store 121 may be representative of a plurality of data stores 121 as can be appreciated. The data stored in the data store 121, for example, is associated with the operation of the various applications and/or functional entities described below.

The components executed on the computing environment 115, for example, include an order fulfillment application 130, and other applications, services, processes, systems, engines, or functionality not discussed in detail herein. The order fulfillment application 130 is executed to orchestrate a picking and a packaging of items 30 from inventory locations 106 in the materials handling center 100 for shipment or other delivery to customers. Accordingly, in various embodiments, the order fulfillment application 130 comprises a unit assignment application 133, a unit monitoring application 136, or similar applications or services.

The unit assignment application 133 is executed to assign items 30 to particular inventory locations 106. For instance, the unit assignment application 133 may assign a particular food item to a refrigeration unit 35 operating at a temperature suitable for the food item. If an item 30 is non-perishable, the unit assignment application 133 may assign the item 30 to an appropriate inventory location 106, such as a shelf or bin in an inventory holder 15.

The unit monitoring application 136 is executed to monitor statuses of refrigeration units 35, mobile drive units 10, or other devices. In one embodiment, the unit monitoring application 136 may monitor temperature and humidity levels inside the refrigeration units 35. In another embodiment, the unit monitoring application 136 may monitor locations of the refrigeration units 35 and the mobile drive units 10 as they move throughout the materials handling center 100. Additionally, the unit monitoring application 136 may monitor battery levels associated with mobile drive units 10 and refrigeration units 35.

The data stored in the data store 121 includes, for example, unit data 145, handling center data 148, item data 149, and potentially other data. The unit data 145 may include, for example, identifiers 152, unit location data 155, sensor data 158, as well as other data. The identifiers 152 may include, for example, a distinctive identifier that uniquely identifies a refrigeration unit 35, a mobile drive unit 10, or other device in the materials handling center 100. The unit location data 155 may include, for example, a current location of a refrigeration unit 35, a mobile drive unit 10, or other device. Additionally, the unit location data 155 may include information associated with a delivery of a refrigeration unit 35 to a particular location in the materials handling center 100.

The sensor data 158 may include information obtained from one or more sensors of the refrigeration unit 35, the mobile drive unit 10, or other device. For example, the sensor data 158 may include a temperature, humidity, or battery level for a refrigeration unit 35. The handling center data 148 may include, for example, station data 162 and inventory data 165. Station data 162 may include an assignment of an inventory item 30 to a particular packing station in a packing station area such that the inventory item 30 can be packed for shipment or other form of delivery.

The inventory data 165 may include a location of an inventory item 30 in the materials handling center 100. To this end, the inventory data 165 may include an identifier for an inventory holder 15, a bin number, a shelf number, or other information that can be used to locate an inventory item 30 from an inventory location 106. The item data 149 may include information associated with an inventory item 30, such as a name, description, weight, unit price, nutritional information, label information, storage temperature, humidity storage level, expiration date, allergy information, or other information.

The refrigeration unit 35 may include a network-enabled device that stores an inventory item 30 at a predetermined temperature (or temperature range). In various embodiments, the refrigeration unit 35 may include, for example, processing circuitry 168, one or more sensors 172, a network interface 175, a battery 178, as well as other components. The processing circuitry 169 may include hardware logic, or a combination of hardware and software logic, configured to control operation of the refrigeration unit 35. In one embodiment, the processing circuitry 168 includes a microcontroller or similar device having at least one hardware processor.

The sensors 172 of the refrigeration unit 35 may include, for example, a temperature sensor, a humidity sensor, a battery level sensor, or other type of sensor. The temperature sensor may be configured to detect an internal temperature of the refrigeration unit 35 while the humidity sensor may be configured to detect an internal humidity of the refrigeration unit 35, as may be appreciated. The network interface 175 may include, for example, a device that enables the processing circuitry to communicate wirelessly over the network 118. To this end, the network interface 175 may include a wireless network card or adapter capable of communication over wireless fidelity (Wi-Fi), near field communication (NFC), Bluetooth®, ZigBee®, or other appropriate medium. The battery 178 may include, for example, a Lithium-ion battery, a Nickel-Cadmium battery, or other suitable type of battery 178.

The mobile drive unit 10 may include a network-enabled device comprising, for example, processing circuitry 180, one or more sensors 183, a network interface 186, a battery 189, as well as other components. The processing circuitry 180 may include hardware logic, or a combination of hardware and software logic, configured to control operation of the mobile drive unit 10. In one embodiment, the processing circuitry 180 comprises a microcontroller or similar device including at least one hardware processor.

The sensors 183 of the mobile drive unit 10 may include, for example, a position sensor, an obstacle sensor, or other type of sensors 183 for use in navigating the materials handling center 100 and transporting inventory holders 15, as can be appreciated. The network interface 186 may include, for example, a device that enables the processing circuitry to communicate wirelessly over the network 118. The network interface 186 may include a wireless network card or adapter capable of communicating over a communication protocol, such as Wi-Fi, NFC, Bluetooth®, ZigBee®, or other suitable communication medium. The battery 189 may include, for example, a Lithium-ion battery, a Nickel-cadmium battery, or other suitable type of battery 189.

The orders 109 may be generated by client devices coupled to the network 118. The client devices may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The materials handling center 100 may include various packing stations 197, charging stations 199, verification stations, shipping areas, sorting stations, and similar areas. In some situations, the items 30 from different orders 109 are identified in a particular one of the inventory locations 106 and a mobile drive unit 10 is assigned to collect an inventory holder 15 or refrigeration unit 35 that includes the item 30. The mobile drive unit 10 will traverse the materials handling center 100 to travel to the inventory holder 15 or refrigeration unit 35, and dock with the inventory holder 15. The mobile drive unit 10 will then proceed to one of the packing stations 197 where personnel of the materials handling center 100 can access the item from the inventory holder 15 and package the item 30 for delivery. Once packaged, the items 30 may be sorted according to their destinations and forwarded to shipping areas for placement on transport vehicles, such as delivery trucks, for shipment to destination addresses.

Next, a general description of the operation of the various components of the networked environment 112 is provided. To begin, the order fulfillment application 130 may receive orders 109 for items 30, for example, as they are generated in an electronic commerce system or other environment. For a given order 109, a handler in a packing station 197 must package an item 30 specified in the order 109 for delivery. To avoid having to navigate the materials handling center 100 on foot, the mobile drive units 10 may be employed to transport an inventory holder 15 to a particular one of the packing stations 197, thereby allowing the handler to obtain the item 30 from the inventory holder 15 and package the item 30 without having to leave the packing station 197.

To this end, once an order 109 for an item 30 is received, the unit assignment application 133 may assign a mobile drive unit 10 to the inventory holder 15 that includes the item 30. The unit assignment application 133 may generate appropriate commands or instructions that direct the mobile drive unit 10 to a location of the inventory holder 15 in the materials handling center 100. Once at the location, the mobile drive unit 10 can dock to the inventory holder 15 to transport the inventory holder 15 to a packing station 197 associated with a handler assigned to pack the item 30. To this end, the unit assignment application 133 may execute to generate tasks for mobile drive units 10, generate routes, transmit health or state information associated with a mobile drive unit 10 or a refrigeration unit 35, or otherwise interact with processing circuitry of the mobile drive unit 10 or the refrigeration unit 35 to control or manage operation of those devices.

In various embodiments, when the mobile drive unit 10 is docked to an inventory holder 15 that includes one or more refrigeration units 35, an electrical coupling may be formed allowing the battery 189 of the mobile drive unit 10 to recharge the battery 178 of the refrigeration unit 35, or to provide power directly to the refrigeration unit 35 or its components.

The unit monitoring application 136 may monitor a status of a refrigeration unit 35 as it resides in an inventory location 106 or as it is transported through the materials handling center 100. For instance, the unit monitoring application 136 may monitor internal temperature and humidity levels measured inside the refrigeration units 35 by one or more sensors 172 of the refrigeration unit 35. In another embodiment, the unit monitoring application 136 may monitor locations of the refrigeration units 35 and the mobile drive units 10 as they move throughout the materials handling center 100.

In the event a temperature, humidity level, battery level, or other setting associated with the refrigeration unit 35 falls below a tolerable threshold, the unit monitoring application 136 may notify the unit assignment application 133 to perform an appropriate remedial action. For instance, if the battery level for the refrigeration unit 35 falls below a tolerable threshold, the unit assignment application 133 may assign a mobile drive unit 10 to transport the refrigeration unit 35 to a charging station 199.

Charging at a charging station 199 may include, for example, docking a mobile drive unit 10 to a charging device to provide power to a battery 189 of the mobile drive unit 10. In some embodiments, the mobile drive unit 10 may charge while carrying an inventory holder 15 or refrigeration unit 35. In these embodiments, power can be passed along from the battery 189 of the mobile drive unit 10 to the battery 178 of the refrigeration unit 35. In other embodiments, the charging device located at a charging station 199 may include a device that electrically couples to the refrigeration unit 35 or the battery 178 of the refrigeration unit 35 to charge independently of the mobile drive unit 10.

Additionally, the battery 178 of the refrigeration unit 35 or the battery 189 of the mobile drive unit 10 may be "hot swappable," allowing the battery 178 and 189 to be replaced with a freshly- or fully-charged battery 178 and 189. In further embodiments, the charging device located at a charging station 199 may include a wireless power transmitter which may provide power to a wireless power receiver in the refrigeration unit 35 or the mobile drive unit 10. To this end, electromagnetic power transfer may be performed using electromagnetic coils, as may be appreciated.

The computing environment 115 may also monitor a climate of a refrigeration unit 35. If the temperature or humidity level indicates that the refrigeration unit 35 is not maintaining an adequate temperature or humidity for storage of one or more items 30 stored therein, the unit assignment application 133 can generate a work order to instruct personnel of the materials handling center 100 to relocate the items 30 stored therein to another refrigeration unit 35.

Figure 4:
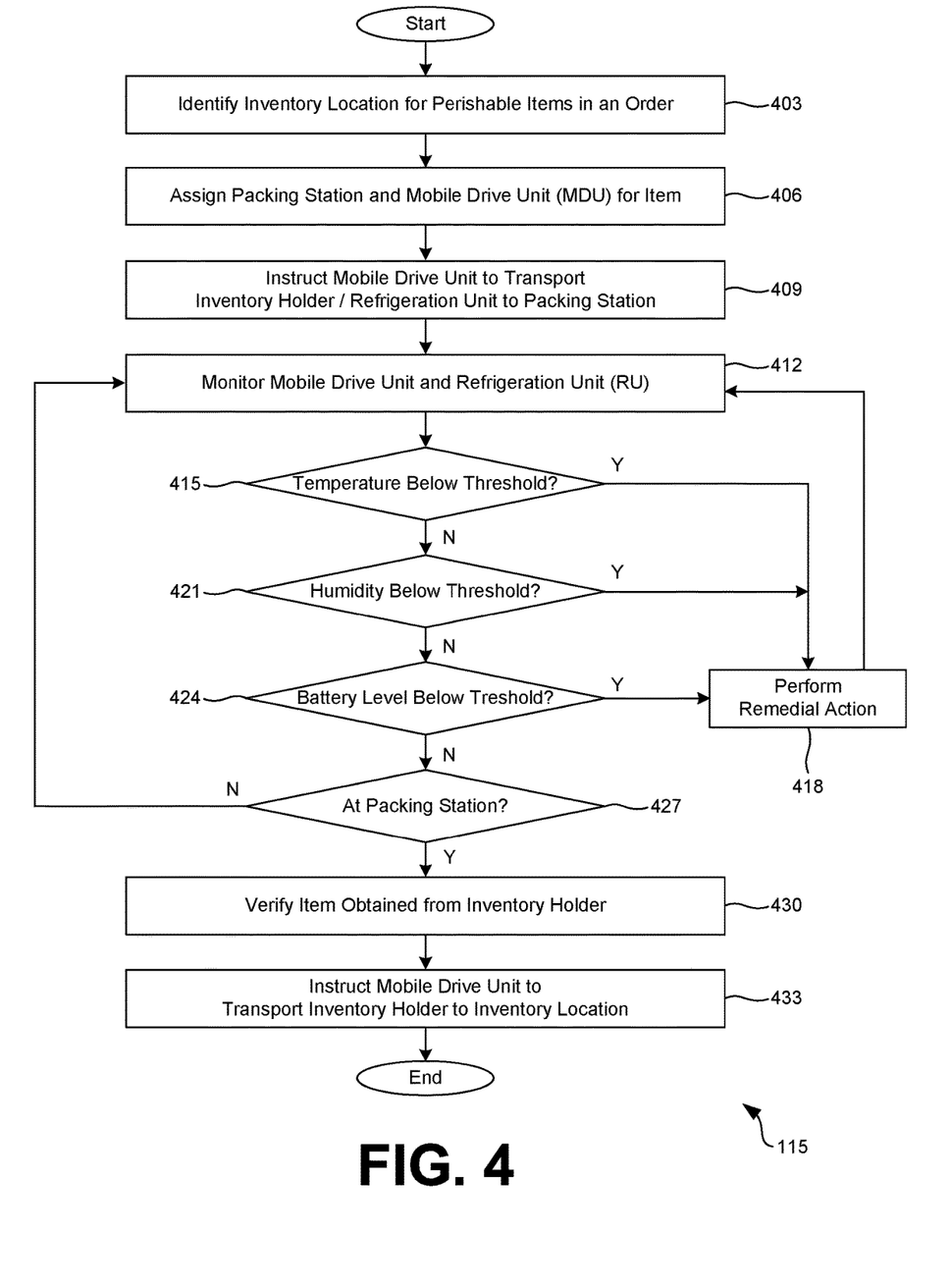
FIGS. 4-6 are flowcharts illustrating example functionality implemented by a computing environment in the networked environment of FIG. 3 according to various embodiments of the present disclosure.

Moving on to FIG. 4, shown is a flowchart that provides one example of the operation of a portion of the computing environment 115 according to various embodiments. It is understood that the flowchart of FIG. 4 provides merely an example of the many different types of functional arrangements that may be employed to implement the operation of the portion of the computing environment 115 as described herein. As an alternative, the flowchart of FIG. 4 may be viewed as depicting an example of elements of a method implemented in the computing environment 115 according to one or more embodiments.

The order fulfillment application 130 may receive orders 109 for items 30, for example, as they are generated in an electronic commerce system or other environment. For a given order 109, a handler in a packing station 197 must package an item 30 specified in the order 109 for delivery. To avoid having to navigate the materials handling center 100 on foot, the mobile drive units 10 may be employed to transport an inventory holder 15 to a particular one of the packing stations 197, thereby allowing the handler to obtain the item 30 from the inventory holder 15 and package the item 30 without having to leave the packing station 197.

Beginning with 403, an inventory location 106 is identified when an order 109 is received for a perishable item 30 or other type of item 30 that may be stored in a refrigeration unit 35. For instance, if a user of an electronic commerce system purchases fruits, vegetables, dairy, meat, or other perishable item 30, the computing environment 115 may identify the inventory locations 106 where those items 30 are stored.

Next, in 406, the computing environment 115 may assign a packing station 197 to package the item 30 as well as a mobile drive unit 10 to retrieve the item 30 from its inventory location 106. As may be appreciated, retrieving the item 30 may include, for example, retrieving an inventory holder 15 in which the item 30 is stored or a stand-alone refrigeration unit 35.

In 409, the mobile drive unit 10 assigned to retrieve the item 30 may be instructed to transport the inventory holder 15 to the packing station 197 or other suitable location for item fulfillment. In various embodiments, this may include generating a first route for the mobile drive unit 10 to navigate to the inventory location 106, or location for the inventory holder 15, as well as a second route for the mobile drive unit 10 to navigate to the packing station 197.

Next, in 412, the computing environment 115 may monitor the mobile drive unit 10 and the refrigeration unit 35 in which the item 30 is stored. For instance, one or more sensors 172 of the refrigeration unit 35 may collect information about the refrigeration unit 35, such as an internal temperature or humidity level. Additionally, one or more sensors 172 of the refrigeration unit 35 may monitor a battery level associated with a battery 178 of the refrigeration unit 35.

Likewise, one or more sensors 183 of the mobile drive unit 10 may monitor a battery level associated with a battery 189 of the mobile drive unit 10. Any data collected by these sensors 172 and 183 may be communicated to the computing environment 115 over the network 118 through respective network interfaces 175 and 186. In some embodiments, the processing circuitry 168 and 180 may generate health scores or other metrics indicating an operability of the refrigeration unit 35 or the mobile drive unit 10, respectively.

The computing environment 115 may also ensure that the assigned mobile drive unit 10 is docked to the inventory holder 15 that includes the refrigeration unit 35, as well as verify that an electrical coupling has been formed. The electrical coupling may permit the battery 189 of the mobile drive unit 10 to recharge the battery 178 of the refrigeration unit 35, or provide power directly to the refrigeration unit 35 or its components.

In 415, the computing environment 115 may utilize data collected from the sensors 172 and 183 to determine whether a temperature of the refrigeration unit 35 has fallen below a predetermined threshold. For instance, item data 149 for an item 30 purchased in the order 109 may be accessed to identify a storage temperature for the item 30. If an internal temperature of the refrigeration unit 35 indicates that the item 30 is not being stored at the storage temperature (or within a predefined range), the process may proceed to 418 where a remedial action may be performed. Remedial actions in this instance may include, for example, adjusting temperature settings for the refrigeration unit 35 in an attempt to restore the internal temperature to the storage temperature for the item 30. In another example, a remedial action may include transporting the refrigeration unit 35 to a station where the item 30 will be discarded or thrown away by personnel of the materials handling center 100. Similarly, if an item 30 has expired based on an expiration date, a remedial action may include transporting the refrigeration unit 35 to a station where the item 30 will be discarded or thrown away. Remedial actions may further include generating a ticket or repair document that causes personnel of the materials handling center 100 to attempt a physical repair of the refrigeration unit 35.

Thereafter, the process can revert to 412 to continue monitoring the mobile drive unit 10 and the refrigeration unit 35 or, if the remedial action is unsuccessful in restoring the storage temperature for the item 30, the process may proceed to completion.

Similarly, in 421, the computing environment 115 may utilize data collected from the sensors 172 and 183 to determine whether a humidity level of the refrigeration unit 35 has fallen below a predetermined threshold. For instance, item data 149 for an item 30 purchased in the order 109 may be accessed to identify a storage humidity level for the item 30. If a humidity level of the refrigeration unit 35 indicates that the item 30 is not being stored at the specified storage humidity level, the process may proceed to 418 where a remedial action may be performed. Remedial actions in this scenario may include, for example, adjusting humidity level settings for the refrigeration unit 35 in an attempt to restore the humidity level to the humidity level specified in association with the item 30. Subsequently, the process can revert to 412 to continue monitoring the mobile drive unit 10 and the refrigeration unit 35 or, if the remedial action is unsuccessful in restoring the humidity level in the refrigeration unit 35, the process may proceed to completion.

Next, in 424, the computing environment 115 may utilize data collected from the sensors 172 and 183 to determine whether a battery level for the refrigeration unit 35 or the mobile drive unit 10 has fallen below a predetermined threshold. If the battery level is below the predetermined threshold, the process may proceed to 418 where a remedial action may be performed. Remedial actions in this instance may include, for example, transporting the refrigeration unit 35 or mobile drive unit 10 to a charging station 199 either before or after fulfillment of the item at a packing station 197. Thereafter, the process can revert to 412 to continue monitoring the mobile drive unit 10 and the refrigeration unit 35 or, if the battery level indicates that the refrigeration unit 35 cannot be transported to the packing station 197, the process may proceed to completion.

In 427, the computing environment 115 may determine whether the refrigeration unit 35 has arrived at an assigned packing station 197 based at least in part on location data collected from the refrigeration unit 35 or the mobile drive unit 10 that transported the refrigeration unit 35. In 430, the computing environment 115 may verify that the item 30 was obtained from the inventory holder 15 or the refrigeration unit 35 by personnel of the materials handling center 100. To this end, verification may include determining whether an item 30 to be fulfilled has been scanned using a barcode reader or similar device.

After the item 30 has been removed from the refrigeration unit 35 and packaged or otherwise prepared for delivery to a customer, in 433, the computing environment 115 may instruct the mobile drive unit 10 to transport the inventory holder 15 to an inventory location 106. The inventory location 106 may include, for example, returning the inventory holder 15 to the location from which the inventory holder 15 was retrieved or, in some embodiments, a more suitable inventory location 106 may be determined based at least in part on operations of the materials handling center 100. Thereafter, the process may proceed to completion.

Figure 5:
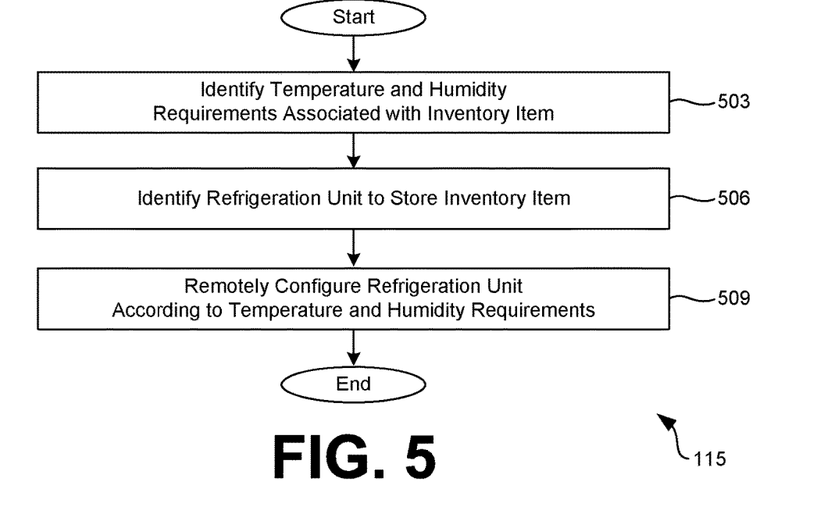

Referring next to FIG. 5, shown is a flowchart that provides one example of the operation of a portion of the computing environment 115 according to various embodiments. It is understood that the flowchart of FIG. 5 provides merely an example of the many different types of functional arrangements that may be employed to implement the operation of the portion of the computing environment 115 as described herein. As an alternative, the flowchart of FIG. 5 may be viewed as depicting an example of elements of a method implemented in the computing environment 115 according to one or more embodiments.

When an item 30 is received in a material handling center 100, for example, from a vendor, wholesaler, or other entity, the item 30 must be stored such that the computing environment 115 can identify its location for item fulfillment. Hence, in 503, the computing environment 115 may identify temperature and humidity requirements associated with the inventory item 30. For example, a bag of frozen chicken may be required to be stored at 40° F. (4.4° C.) or below. In 506, using the humidity or temperature requirement identified in 503, a refrigeration unit 35 may be identified for storing the item 30. In one embodiment, the refrigeration unit 35 is identified based at least in part on a current humidity or temperature setting of the refrigeration unit 35 that may be compatible with the humidity or temperature requirements of the item 30. In another embodiment, the refrigeration unit 35 is identified based at least in part on a current location of similar items 30, or items 30 having a same or similar category. For example, frozen strawberries may be stored with other frozen fruit. As may be appreciated, other factors may be relevant in identifying the refrigeration unit 35. Predefined constraints may be stored in the data store 121 indicating that certain types of items 30 should not be stored with other types of items 30 despite potentially having a same or similar temperature requirements. For example, frozen fruit may be stored separately from frozen chicken to avoid cross-contamination of food products.

In 509, the computing environment 115 can remotely configure the refrigeration unit 35 to the required temperature or humidity level (or within a predefined range), if necessary, such that the item 30 is stored at its required temperature or humidity level. Thereafter, the process may proceed to completion.

Figure 6:
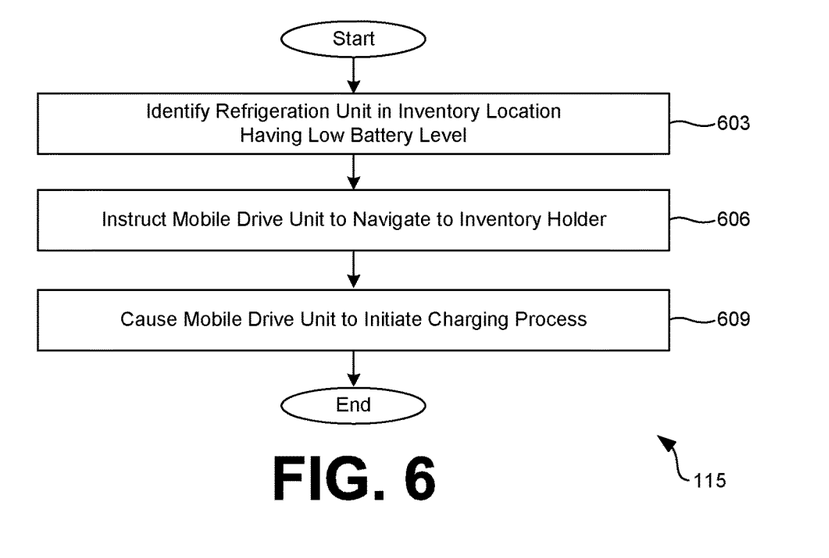

Referring next to FIG. 6, shown is a flowchart that provides one example of the operation of a portion of the computing environment 115 according to various embodiments. It is understood that the flowchart of FIG. 5 provides merely an example of the many different types of functional arrangements that may be employed to implement the operation of the portion of the computing environment 115 as described herein. As an alternative, the flowchart of FIG. 5 may be viewed as depicting an example of elements of a method implemented in the computing environment 115 according to one or more embodiments.

In various situations, it may not be efficient to transport a refrigeration unit 35 to a charging station 199. Accordingly, in some embodiments, a mobile drive unit 10 is instructed to travel to an inventory location 106 to charge a refrigeration unit 35, or a battery associated therewith, at its current location, as opposed to transporting the refrigeration unit 35. To begin, in 603, the computing environment 115 may identify a refrigeration unit 35 at an inventory location 106 having a low battery level. In other words, a refrigeration unit 35 at an inventory location 106 having a battery level below a predetermined threshold may be identified.

Next, in 606, a mobile drive unit 10 may be identified and instructed to navigate to the inventory holder 15 associated with the inventory location 106. In some embodiments, a mobile drive unit 10 may be identified based at least in part on a current battery level of the mobile drive unit 10. For instance, a mobile drive unit 10 having a battery level capable of completely charging a battery of a refrigeration unit 35 may be identified.

Once the mobile drive unit 10 has navigated to the inventory holder 15 associated with the inventory location 106, in 609, the computing environment 115 may cause the mobile drive unit 10 to initiate a charging process. The charging process may include, for example, causing the mobile drive unit 10 to electrically couple to an inventory holder 15 or a component associated therewith. In one embodiment, a mobile drive unit 10 may have a male or female port located at or near a top surface of the mobile drive unit 10 that couples to an opposing male or female port location at or near a docking surface 28 of the inventory holder 15. When the mobile drive unit 10 is docked or coupled to the inventory holder 15, an electrical coupling is established allowing power from a battery 189 of the mobile drive unit 10 to recharge a battery 178 of the refrigeration unit 35. Thereafter, the process may proceed to completion.

Figure 7:
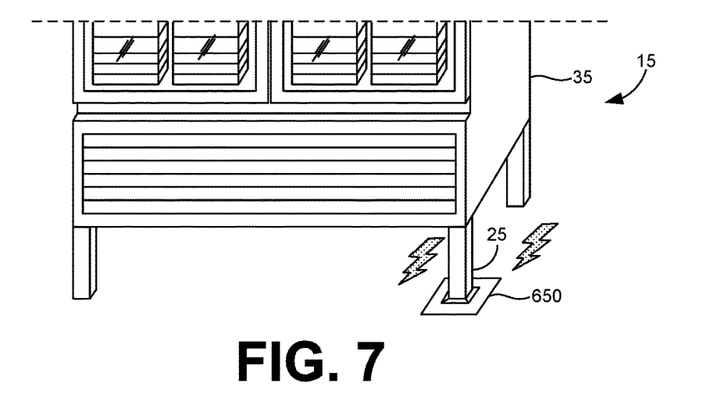
FIG. 7 is a drawing of an inventory holder coupled to a floor-mounted charging mechanism according to various embodiments of the present disclosure.

Turning now to FIG. 7, an inventory holder 15 is shown coupled to a floor-mounted charging mechanism 650. In some embodiments, the mobile drive unit 10 may transfer an inventory holder 15 or a refrigeration unit 35 stored thereon to a charging station 199. For example, if a battery 178 of a refrigeration unit 35 is low or has depleted, a mobile drive unit 10 may be tasked with transferring the refrigeration unit 35 to a charging station 199 that includes a floor-mounted charging mechanism 650. The mobile drive unit 10 may position one or more legs 25 of the inventory holder 15 to electrically couple to the floor-mounted charging mechanism 650. To this end, a leg 25 may include circuitry coupled to a battery 178 of a refrigeration unit 35 that allows power to be provided form the floor-mounted charging mechanism 650. The floor-mounted charging mechanism 650 include one of a male or female port that couples to an opposing male or female port location at or near one or more legs 25 of the inventory holder 15. While the example of FIG. 7 depicts a floor-mounted charging mechanism 650, the disclosure is not so limited. For instance, in some embodiments, the inventory holder 15 or the refrigeration unit 35 stored thereon may electrically couple to a wall-mounted charging mechanism or other appropriate charging mechanism.

Figure 8:
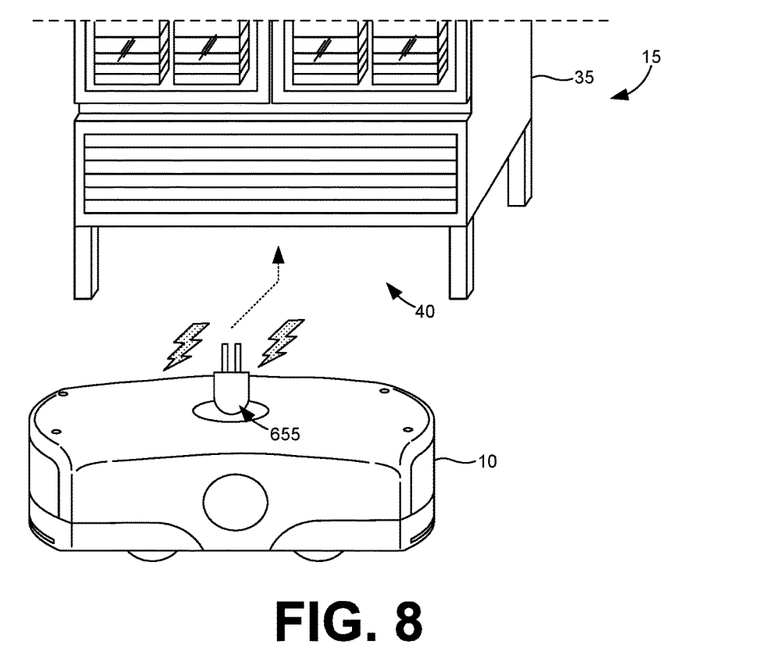
FIG. 8 is a drawing of an inventory holder and a mobile drive unit according to various embodiments of the present disclosure.

Referring next to FIG. 8, an inventory holder 15 and a mobile drive unit 10 are shown. In various embodiments, the mobile drive unit 10 may not include a docking component 17 or other components required to physically lift or transport the inventory holder 15. To this end, the mobile drive unit 10 may include a special-purpose drive unit employed only to charge or otherwise provide power to the inventory holder 15 or its components. In one embodiment, the mobile drive unit 10 includes a drive unit charging mechanism 655 that may electrically couple to circuitry of the inventory holder 15, for example, to recharge a battery 178 of a refrigeration unit 35 using a battery 189 of the mobile drive unit 10. The drive unit charging mechanism 655 may include one of a male or female port that couples to an opposing male or female port location of the inventory holder 15, for example, in the opening 40.

Additionally, the drive unit charging mechanism 655 may retract from, or into, a body of the mobile drive unit 10 until the mobile drive unit 35 is in position, such as in the opening 40, to couple to the inventory holder 15. While the non-limiting example of FIG. 8 shows a charging mechanism 655 that couples to the inventory holder 15, in other embodiments, may comprise components that remove and replace a battery 178 associated with the inventory holder 15, such as a battery 178 of the refrigeration unit 35.

Figure 9:
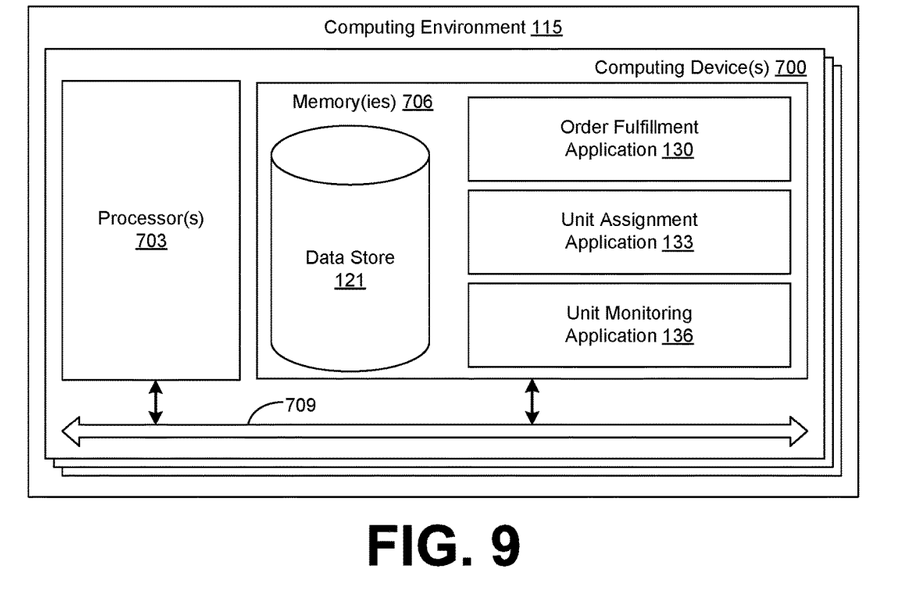
FIG. 9 is a schematic block diagram that provides one example illustration of a computing environment employed in the networked environment of FIG. 3 according to various embodiments of the present disclosure.

With reference to FIG. 9, shown is a schematic block diagram of the computing environment 115 according to an embodiment of the present disclosure. The computing environment 115 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the order fulfillment application 130, the unit assignment application 133, the unit monitoring application 136, and potentially other applications. Also stored in the memory 706 may be a data store 121 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703.

Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the order fulfillment application 130, the unit assignment application 133, the unit monitoring application 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4, 5, and 6 show the functionality and operation of an implementation of portions of the order fulfillment application 130, the unit assignment application 133, and the unit monitoring application 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4, 5, and 6 show a specific order of execution, it is understood that the order of execution may differ from that which is depicted. For example, the order of execution of two or more blocks may be scrambled relative to the order shown. Also, two or more blocks shown in succession in FIGS. 4, 5, and 6 may be executed concurrently or with partial concurrence. Further, in some embodiments, one or more of the blocks shown in FIGS. 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the order fulfillment application 130, the unit assignment application 133, and the unit monitoring application 136, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the order fulfillment application 130, the unit assignment application 133, the unit monitoring application 136, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 115.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
an inventory holder comprising a frame, the frame having a power supply, the frame further comprising a plurality of shelves, at least a portion of the shelves being configured to store non-perishable items thereon;
a plurality of refrigeration units electrically coupled to the power supply and positioned on the shelves, individual ones of the refrigeration units being configured to store perishable items therein and comprising:
a battery;
a sensor configured to measure an internal temperature;
a network interface; and
processing circuitry configured to:
communicate the internal temperature of a respective one of the refrigeration units to the at least one computing device over a network using the network interface; and
adjust the internal temperature in response to receipt of a request from the at least one computing device, the internal temperature being adjusted based at least in part on a temperature characteristic of an item assigned for storage therein; and
a mobile drive unit being configured to:
physically couple to the inventory holder and electrically couple to and perform a charging process that charges the battery of the refrigeration units and the power supply of the frame;
transport the inventory holder and the refrigeration units from a first location to a second location based at least in part on an instruction received from the at least one computing device; and
transport the inventory holder and the refrigeration units from the second location to a third location based at least in part on the item being removed from the respective one of the refrigeration units and scanned.

2. The system of claim 1, wherein:
the mobile drive unit comprises a drive unit battery and at least one battery level sensor configured to measure a battery level associated with the drive unit battery; and
the mobile drive unit is configured to transport the refrigeration units from the first location to a charging station in response to the battery level being below a threshold level.

3. The system of claim 1, wherein:
the refrigeration units further comprise at least one battery level sensor configured to measure a battery level associated with the battery; and
the mobile drive unit is configured to transport the frame and the refrigeration units from the first location to a charging station in response to the battery level being below a threshold level.

4. A system, comprising:
an inventory holder comprising a frame having a plurality of shelves, the inventory holder comprising a power supply;
a plurality of refrigeration units stored on the shelves and coupled to the power supply, individual ones of the plurality of refrigeration units comprising:
a battery; and
a network interface for communication with at least one computing device; and
a first mobile drive unit being configured to perform a charging process that comprises navigating through an opening of the frame and electrically coupling to the inventory holder and the plurality of refrigeration units to charge the inventory holder or the plurality of refrigeration units; and
a second mobile drive unit being configured to transport the inventory holder and the plurality of refrigeration units from a first location to a second location.

5. The system of claim 4, wherein the first mobile drive unit is configured to dock with the frame of the inventory holder.

6. The system of claim 4, wherein the individual ones of the plurality of refrigeration units further comprise at least one sensor configured to measure an internal temperature.

7. The system of claim 6, wherein the individual ones of the plurality of refrigeration units further comprise processing circuitry being configured to:
determine that the internal temperature of a respective one of the plurality of refrigeration units is within a temperature threshold associated with at least one item stored therein; and
in response to the internal temperature of the respective one of the refrigeration units not being within the temperature threshold, adjust the internal temperature.

8. The system of claim 6, wherein the individual ones of the plurality of refrigeration units further comprise processing circuitry being configured to:
communicate the internal temperature to the at least one computing device over a network using the network interface; and
adjust the internal temperature of a respective one of the plurality of refrigeration units in response to receipt of a request from the at least one computing device.

9. The system of claim 4, wherein the first mobile drive unit provides power to the battery of the plurality of refrigeration units or to at least one other component of the plurality of refrigeration units.

10. The system of claim 4, wherein the second mobile drive unit is configured to receive an instruction from the at least one computing device through the network interface that causes the second mobile drive unit to transport the refrigeration units from the first location to the second location.

11. The system of claim 4, wherein:
the first mobile drive unit and the second mobile drive unit comprise a battery and at least one sensor configured to measure a battery level associated with the battery; and
the first mobile drive unit and the second mobile drive unit are configured to transport the plurality of refrigeration units from the first location to a charging station in response to the battery level being within a threshold level.

12. The system of claim 4, wherein:
individual ones of the plurality of refrigeration units comprise a battery and at least one sensor configured to measure a battery level associated with the battery; and
the second mobile drive unit is configured to transport the plurality of refrigeration units from the first location to a charging station in response to the battery level being within a threshold level.

13. The system of claim 4, wherein the second location is associated with a charging station.

14. The system of claim 4, wherein the frame of the inventory holder comprises at least one leg having a length suitable to receive the first mobile drive unit at a position underneath the plurality of refrigeration units, wherein the at least one leg is configured to electrically couple to a floor-mounted charging mechanism.

15. A method, comprising:
identifying, by at least one computing device comprising at least one hardware processor, that a battery level associated with at least one refrigeration unit has fallen below a predefined threshold;
receiving, by the at least one computing device, location data associated with the at least one refrigeration unit;
communicating, by the at least one computing device, an instruction to a first mobile drive unit that causes the first mobile drive unit to navigate to a current location of the at least one refrigeration unit based at least in part on the location data;
causing, by the at least one computing device, the first mobile drive unit to initiate a charging process, wherein the charging process comprises the first mobile drive unit electrically coupling to the at least one refrigeration unit and charging a power supply of the at least one refrigeration unit;

identifying, by the at least one computing device, that the current location of the at least one refrigeration unit is a packing station;
verifying, by the at least one computing device, that at least one item has been removed from the at least one computing device and scanned; and
in response to the at least one item being removed and scanned, causing, by the at least one computing device, a second mobile drive unit to transport the at least one refrigeration unit from a first location to a second location.

16. The method of claim 15, wherein the charging process further comprises a battery of the at least one refrigeration unit being swapped with a fully-charged battery.

17. The method of claim 15, further comprising causing, by the at least one computing device, the first mobile drive unit to transport the at least one refrigeration unit from the current location to a location associated with the packing station.

18. The method of claim 15, further comprising causing, by the at least one computing device, the second mobile drive unit to transport the at least one refrigeration unit from the current location to a location associated with a charging station.

19. The method of claim 16, wherein at least one component of the at least one refrigeration unit comprises a battery.

20. The method of claim 15, wherein the battery level associated with the at least one refrigeration unit is identified from at least one sensor of the at least one refrigeration unit and communicated to the at least one computing device through a network interface of the at least one refrigeration unit.

21. The method of claim 15, further comprising:
identifying, by the at least one computing device, an internal temperature or an internal humidity level of a cell within the at least one refrigeration unit; and
adjusting, by the at least one computing device, the internal temperature or the internal humidity level based at least in part on a required temperature or a required humidity level associated with an item to be stored in the at least one refrigeration unit.

* * * * *